C. D. WOODWARD.
SCREW.
APPLICATION FILED FEB. 28, 1917.
1,235,626.
Patented Aug. 7, 1917.
FIG. 1.
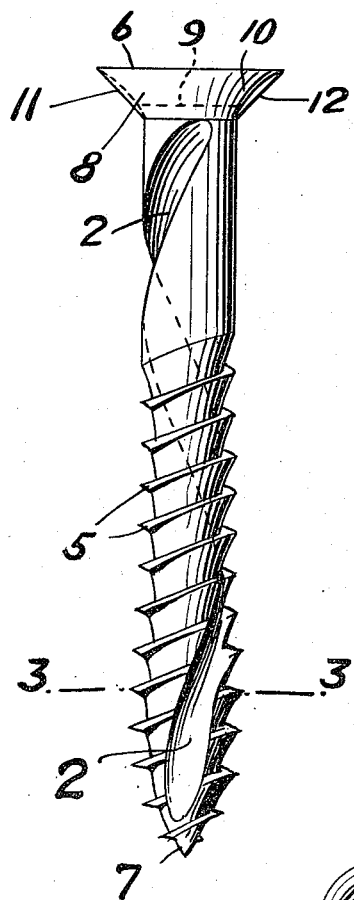
FIG. 2.
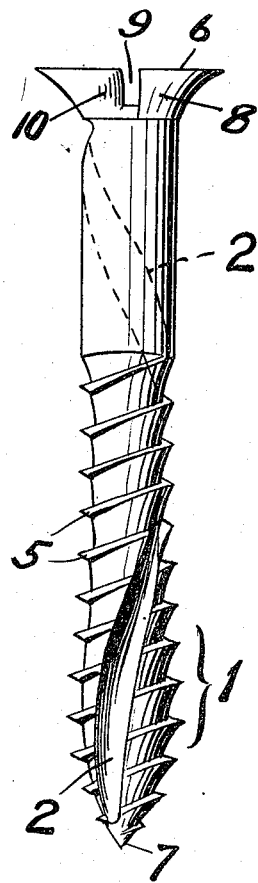
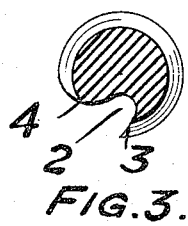
FIG. 3.
WITNESS:
INVENTOR
Charles D. Woodward
BY
ATTORNEY.

UNITED STATES PATENT OFFICE.

CHARLES DANIEL WOODWARD, OF PROVIDENCE, RHODE ISLAND.

SCREW.

1,235,626.  Specification of Letters Patent.  Patented Aug. 7, 1917.

Application filed February 28, 1917. Serial No. 151,405.

*To all whom it may concern:*

Be it known that I, CHARLES D. WOODWARD, a citizen of the United States, residing at Providence, in the county of Providence and State of Rhode Island, have invented a certain new and useful Screw, of which the following is a specification.

My invention is an improvement in countersinking screws, and its objects are, first, to provide a strong screw which can be easily driven and countersunk by means of a screwdriver into even the hardest wood without the provision of a hole for its reception, and which is thereafter secure against accidental loosening, and second, to retain the full strength of the head and so obviate breakage when a screw-driver is applied and used.

In describing a countersinking screw of my invention I will refer to the accompanying drawings in which—

Figure 1, is an elevation of a screw embodying features of the invention.

Fig. 2, is a similar view taken ninety degrees from the plane of Fig. 1, and

Fig. 3, is an enlarged sectional view taken on the line 3—3 of Fig. 1.

In the drawings 1, is a bulge at the root of the gimlet-point of the screw and it constitutes the largest diameter of the shank. 2, is a spiral groove, one edge 3, Fig. 3, of which is undercut to form a cutter at the bulge, and the other edge 4 of which is rounded and affords clearance. The groove 2 may be said to be generally hook-shaped in cross-section. The spiral groove 2, crosses the threads 5, of the screw and goes once around the screw. This groove 2 extends from under the slant of the head 6, of the screw, to the root of the gimlet point 7. The slant of the head is convex as at 8, near the ends of the slot 9, and concave as at 10, between the convex portions 8, thus the two countersinking cutters 11 and 12, Fig. 1, are formed at the ends of the slot, while at the same time the strength of the head 6, is not reduced. The described arrangement of the bulge 1 and cutter 3 at the root of the point of the screw facilitates the insertion of the screw by confining the principal part of the cutting operation to the bulged portion of the screw. Moreover this arrangement allows the cut-away material or chips to travel to and along the shank, and so to secure the screw from loosening. The head is self-sinking, while by reason of the way in which the cutters 11 and 12 are formed, substantially its full strength is maintained.

The described arrangement and structure of parts, more especially the bulged cutter 3, and the cutters 11 and 12, causes them to coöperate in the operation of inserting and countersinking the screw without first providing a hole or opening.

What I claim is:

A countersinking gimlet pointed screw having at the root of its point a bulge constituting the largest diameter of the shank and having across its thread a spiral groove one edge of which forms a cutter at the bulge, and said groove going once around the screw and terminating at the slant of the head and at the root of the gimlet point.

CHARLES DANIEL WOODWARD.